United States Patent
Hwang et al.

(10) Patent No.: US 9,485,630 B2
(45) Date of Patent: Nov. 1, 2016

(54) METHODS AND DEVICES FOR ENABLING RECEPTION OF A SPECIFIC SERVICE FOR TERMINALS IN IDLE MODE

(75) Inventors: Woonhee Hwang, Espoo (FI); Henri Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 56 days.

(21) Appl. No.: 14/113,599

(22) PCT Filed: Apr. 28, 2011

(86) PCT No.: PCT/EP2011/056723
§ 371 (c)(1),
(2), (4) Date: Oct. 24, 2013

(87) PCT Pub. No.: WO2012/146284
PCT Pub. Date: Nov. 1, 2012

(65) Prior Publication Data
US 2014/0044035 A1    Feb. 13, 2014

(51) Int. Cl.
| H04H 20/71 | (2008.01) |
| H04W 4/06 | (2009.01) |
| H04W 72/00 | (2009.01) |
| H04W 48/16 | (2009.01) |

(52) U.S. Cl.
CPC ............. *H04W 4/06* (2013.01); *H04W 72/005* (2013.01); *H04W 48/16* (2013.01)

(58) Field of Classification Search
CPC .............................. H04W 72/005; H04W 4/06
See application file for complete search history.

(56) References Cited

U.S. PATENT DOCUMENTS

| 6,996,221 B1 * | 2/2006 | Baiyor | H04M 3/56 379/202.01 |
| 2002/0146030 A1 * | 10/2002 | Simonsen | H04W 52/50 370/442 |
| 2005/0249140 A1 | 11/2005 | Lee et al. | 370/312 |
| 2007/0191019 A1 * | 8/2007 | Fischer | H04W 72/005 455/452.2 |

(Continued)

FOREIGN PATENT DOCUMENTS

| CN | 1750707 A | 3/2006 |
| CN | 1839652 A | 9/2006 |

(Continued)

OTHER PUBLICATIONS

3GPP TSG-RAN WG2 Meeting #68, Jeju, Korea, Nov. 9-13, 2009, R2-096562, "Alleviating effects of unicast mobility on MBMS" Nokia Corporation, Nokia Siemens Networks, 2 pgs.

*Primary Examiner* — Khaled Kassim
*Assistant Examiner* — Syed S Ali
(74) *Attorney, Agent, or Firm* — Harrington & Smith (57) ABSTRACT

The present invention relates to methods and devices for enabling reception of a specific service for terminals idle mode. More particularly, the present invention relates to such methods and devices enabling mobility for terminals in idle mode so as to receive an MBMS service. In case a terminal is interested in the MBMS service, it applies different reselection rule than normal reselection rule i.e., when the terminal is not interested in the MBMS service. For instance, the terminal manipulates the priority indications received from an eNB and considers MBMS layer the highest priority in case the terminal is interested in MBMS service. If the terminal thus manipulates the priority due to the (intended) MBMS reception, the terminal starts an MBMS timer, which is received as a permission parameter from the eNB.

14 Claims, 3 Drawing Sheets

(56) References Cited

U.S. PATENT DOCUMENTS

| | | | |
|---|---|---|---|
| 2008/0305790 A1* | 12/2008 | Wakabayashi | H04B 7/022 455/434 |
| 2009/0080358 A1* | 3/2009 | Song | 370/312 |
| 2009/0238117 A1* | 9/2009 | Somasundaram et al. | 370/328 |
| 2009/0320078 A1* | 12/2009 | Pulver | H04H 20/38 725/62 |
| 2010/0234034 A1* | 9/2010 | Aoyama et al. | 455/450 |
| 2013/0182632 A1* | 7/2013 | Maeda | H04W 28/0205 370/312 |
| 2014/0348052 A1* | 11/2014 | Kalhan | H04W 72/005 370/312 |

FOREIGN PATENT DOCUMENTS

| | | |
|---|---|---|
| CN | 101299831 A | 11/2008 |
| CN | 101502025 A | 8/2009 |
| EP | 1 950 986 A1 | 7/2008 |

* cited by examiner

METHODS AND DEVICES FOR ENABLING RECEPTION OF A SPECIFIC SERVICE FOR TERMINALS IN IDLE MODE

FIELD OF THE INVENTION

The present invention relates to methods and devices for enabling reception of a specific service for terminals idle mode. More particularly, the present invention relates to such methods and devices enabling mobility for terminals in idle mode so as to receive an MBMS service.

BACKGROUND

This invention relates to mobile communication and as an example refers to the currently discussed and developed Long-Term Evolution standard (LTE), which features, among others, a Multimedia Broadcast-Multicast Service (MBMS). Service of MBMS may comprise for example, audio, video, still images, or any other type of media or combined media types such as mobile-TV or the like, without limiting the applicability of the present invention, whether to the media type or types or to the service as such.

In its previous release, i.e. LTE Rel-9, those standards include a basic MBMS functionality, of pure broadcast-mode MBMS transmission. The subsequent release, i.e. LTE Rel-10 has further developed such MBMS service in various aspects.

That is, in brief, responsive to a network-broadcast request, terminals (such as user equipments UEs) which are in a connected state in terms of radio resource control (RRC), i.e. in RRC_Connected mode, indicate if they are interested in receiving such services.

MBMS reception is possible for a terminal UE just as well in another mode or state known as RRC_Idle. Note that while MBMS service is used in singular here, it is understood that plural services may be covered. Many terminals UE which are in state RRC_Idle are present in each tracking area. A tracking area generally denotes the area and/or one or more cells where, as opposed to an exact cell, a UE in RRC_Idle is known to reside or to camp.

UE mobility for UE's in IDLE mode is generally to a certain extent based on the UE decision rather than on a network decision as in a handover procedure. Thus, the network has only little control over IDLE mode UE mobility due to a lacking RRC connection.

As a UE, when in IDLE mode, is not RRC connected to the network yet, balancing a network load originating by the IDLE mode UE' is not as critical as for balancing a network load due to UE's in CONNECTED mode. However as IDLE mode UEs will make the connection to the network on the layer (or frequency) where it is camped on, in the bigger meaning, IDLE mode UE load balancing is related to CONNECTED mode UE load balancing. At the latest in the event that an IDLE mode UE transits to CONNECTED mode, the network load balance is likely to be affected by the layers on which the IDLE mode UE was camped on. Namely, when paged, the IDLE mode UE will respond on the layer on which it was paged and establish an RRC connection on that layer.

Thus it is important that network can control IDLE mode mobility and UE camping is predictable. ("Mobility" in this context rather refers to inter-frequency/inter-layer mobility rather than to spatial mobility.) Also, due to the operator policy, operators may want to keep the UEs more in certain frequency or RAT. And for the IDLE mode UE distribution, priority per frequency and RAT is included in a system information block SIB. Therefore, it is beneficial that UE follows the priority which the network provides as broadcasted information in the SIB.

However, for MBMS reception in Rel-11, it is necessary for the network to allow UE to violate (or diverge from) the current reselection rule. However, if so, the network will lose control and load balancing in for IDLE mode UE's and also for CONNECTED mode UE's load balancing control will be lost at the latest once IDLE UE's transit to CONNECTED mode. Also, as UE behaviours may be different from UE to UE or from user to user, there is no longer a predictable behaviour of the UEs within the network.

Therefore, it is an object of the present invention to propose improvements in scenarios for service reception for terminals in IDLE mode.

SUMMARY OF THE INVENTION

This invention is providing means to retain such situation still under network control and in a predictable manner.

According to a first aspect, the above object is for example accomplished by a device, comprising a transmitter module configured to transmit a priority indication of assigned priority for plural communication layers available within a coverage area of the device, and configured to indicate a service indication assigned to at least one of said communication layers on which layer a terminal may access a specific service, said transmitter module is further configured to transmit at least one permission parameter controlling a receiving terminal in terms of initiating action in regard to accessing the specific service, wherein said at least one permission parameter comprises
a first timing parameter controlling the receiving terminal in terms of permitting the terminal to initiate action in regard to accessing the specific service.

According to further developments of the device:
at least said service indication is broadcasted to all terminals within the coverage area of the device;
said at least one permission parameter is broadcasted via a shared channel and valid for all receiving terminals or transmitted via a respective dedicated channel and valid for a respective individual terminal to which the dedicated channel is associated;
said at least one permission parameter comprises a second timing parameter controlling the receiving terminal in terms of inhibiting the terminal to initiate action in regard to accessing the specific service.

According to another aspect, the above object is for example accomplished by a device, comprising a receiver module, configured to receive a priority indication of assigned priority for plural communication layers available within a coverage area of a network node, and configured to receive a service indication assigned to at least one of said communication layers on which layer a terminal may access a specific service, and a processor module, configured to manipulate the received priority indication of assigned priority for the communication layers, said processor module is controlled in terms of manipulating the received priority indication for initiating action in regard to accessing the specific service based on at least one permission parameter, wherein said at least one permission parameter comprises a first timing parameter controlling the processor module in terms of permitting the terminal to initiate action in regard to accessing the specific service.

According to further developments of the device,
said receiver module is configured to receive at least said service indication on a broadcast control channel;

said processor module is configured to receive said at least one permission parameter on a shared control channel, or on a dedicated channel associated to the device, or to receive it from an internal memory in which the configured parameter is stored;

said at least one permission parameter comprises a second timing parameter controlling the processor module in terms of inhibiting the terminal to initiate action in regard to accessing the specific service;

it further comprises a timer module that is started using the first timing parameter, if the device manipulated the received priority indication and if the device does not yet or not anymore receive the specific service on the layer of which the priority indication was manipulated;

the timer is stopped and reset when either of the above conditions is no longer true.

According to a still further aspect, the above object is for example accomplished by a method comprising transmitting a priority indication of assigned priority for plural communication layers available within a coverage area of a network node, and indicating a service indication assigned to at least one of said communication layers on which layer a terminal may access a specific service, transmitting at least one permission parameter controlling a receiving terminal in terms of initiating action in regard to accessing the specific service, wherein said at least one permission parameter comprises a first timing parameter controlling the receiving terminal in terms of permitting the terminal to initiate action in regard to accessing the specific service.

According to further developments of the method, it further comprises broadcasting at least said service indication to all terminals within the coverage area of the network node;

it further comprises broadcasting said at least one permission parameter via a shared channel and being valid for all receiving terminals or transmitting said at least one permission parameter via a respective dedicated channel and being valid for a respective individual terminal to which the dedicated channel is associated;

said at least one permission parameter comprises a second timing parameter controlling the receiving terminal in terms of inhibiting the terminal to initiate action in regard to accessing the specific service.

According to another aspect, the above object is for example accomplished by a method, comprising receiving a priority indication of assigned priority for plural communication layers available within a coverage area of network node, and configured to receive a service indication assigned to at least one of said communication layers on which layer a terminal may access a specific service, and manipulating the received priority indication of assigned priority for the communication layers, controlling the manipulating of the received priority indication for initiating action in regard to accessing the specific service, based on at least one permission parameter, wherein said at least one permission parameter comprises a first timing parameter controlling the manipulating in terms of permitting a terminal to initiate action in regard to accessing the specific service.

According to further developments of the method, it further comprises receiving at least said service indication on a broadcast control channel;

it further comprises receiving said at least one permission parameter on a shared control channel, or on a dedicated channel associated to the device, or from an internal memory in which the configured parameter is stored;

said at least one permission parameter comprises a second timing parameter controlling the manipulating in terms of inhibiting the terminal to initiate action in regard to accessing the specific service;

it further comprises starting a first timer using the first timing parameter, if the device manipulated the received priority indication and if the device does not yet or not anymore receive the specific service on the layer of which the priority indication was manipulated;

the timer is stopped and reset when either of the above conditions is no longer true.

For at least one of the above device and/or the above method aspect, a second timer is started using the second timing parameter, after the first timer expired with no reception of the specific service on the manipulated layer.

Accordingly, by virtue of the above aspects proposed by the present invention, at least according to one or more exemplary embodiments and/or features of the invention, the following advantageous effects are realized:

un-standardized behavior of UE's is prevented, controllability of network performance and behavior is preserved for the network and/or the operators, the UE's capability to access a specified service such as MBMS while in IDLE mode is preserved, the UE has a well defined and at least timely restricted permission to manipulate its mobility in the layers, network behavior remains predictable and controllable, by signaling at least some parameter in an individualized manner via dedicated channels to a UE concerned, behavior of UEs can be selectively controlled and UEs are thus grouped in terms of behavior, thereby further supporting e.g. load balancing

BRIEF DESCRIPTION OF THE DRAWINGS

The present invention will be more readily understood when referring to the accompanying drawings, in which.

DETAILED DESCRIPTION

Prior to describing the individual drawings, the subsequent section will outline briefly an overall description of at least an exemplary aspect of the present invention. It is believed to be proper to obtain a general understanding of the functionalities conceived under the present invention. In Brief:

An eNB broadcasts, which neighboring frequency provides MBMS service. Also, to help UE to reselect a cell in the MBMS layer quickly, the network (eNB) may include another set of reselection parameters for the cell reselection to a cell in the MBMS layer.

In case the UE is interested in the MBMS service, it applies different reselection rule than normal reselection rule i.e., when UE is not interested in the MBMS service. For instance, UE considers MBMS layer the highest priority in case UE is interested in MBMS service.

If UE thus manipulates the priority due to the (intended) MBMS reception, UE starts an MBMS timer. The timer value can be either fixed in the specification (e.g. stored in the device's internal memory) or signaled in the SIB as well.

The timer value can also be reconfigured in the dedicated RRC message, specifically for the terminal.

If UE finishes the reception of MBMS and decides to stay in MBMS layer for some reason, UE re-starts the MBMS timer.

When the MBMS timer is expired and if UE is not receiving MBMS service yet, UE applies the normal priority/reselection scheme as informed in the SIB for certain waiting duration to prevent UE manipulating priorities in the SIB for prolonged time without receiving MBMS.

While, however, the present invention has hereinbefore been described only roughly in a system/method overview style, herein below a description of some individual devices and methods performed by them will be given in greater detail. Note that all modifications described with regard to an exemplary embodiment can also be valid/possible for another exemplary embodiment, and in particular, individual modifications in a respective exemplary embodiment may be combined in another exemplary embodiment.

Figure 1:
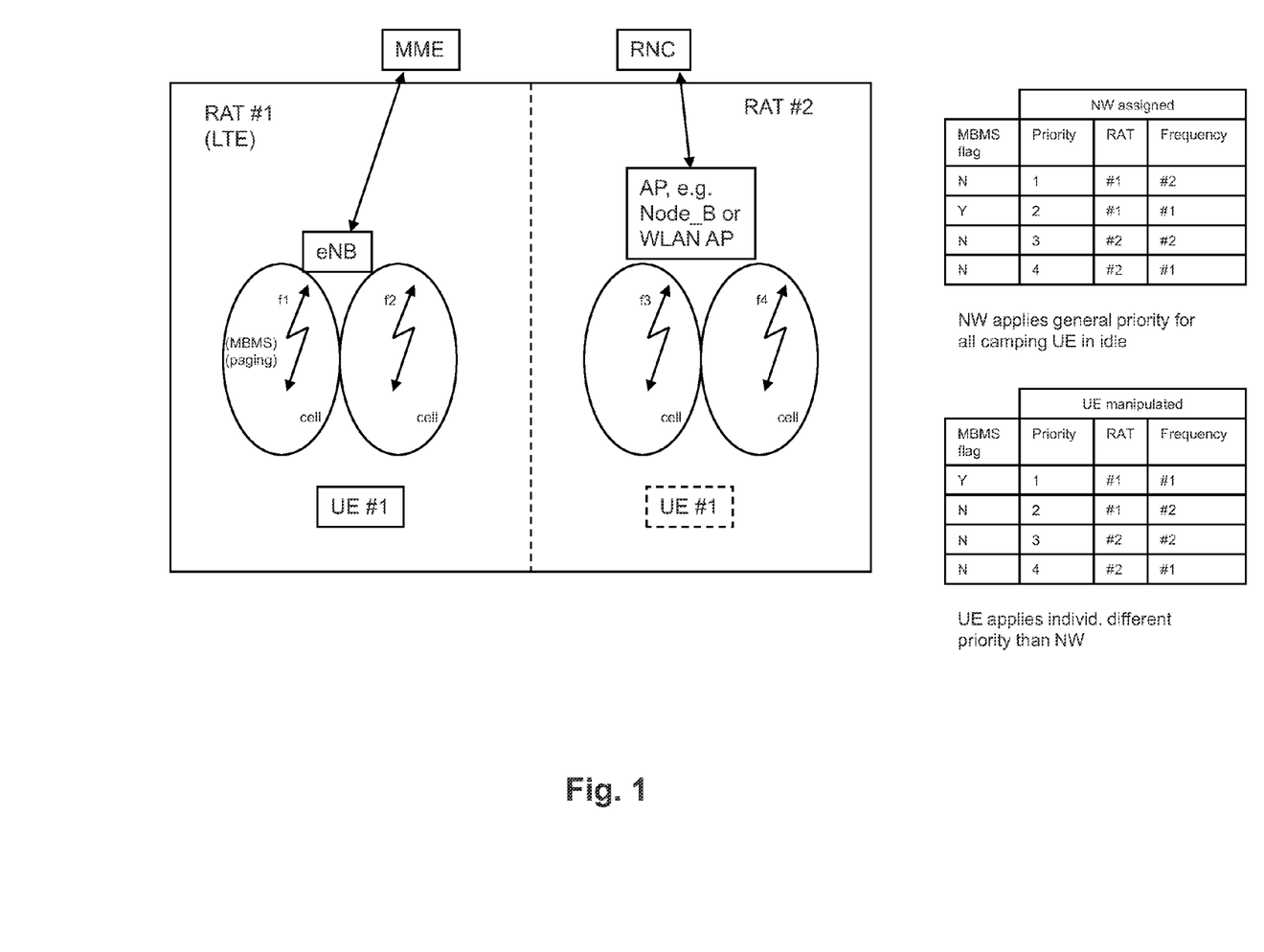
FIG. 1 shows a partial overview of a network with entities involved in some exemplary embodiments of the invention.

FIG. 1 shows a partial overview of a network with entities involved in some interaction with each other. FIG. 1 schematically illustrates a part of a network that is referred to in some scenarios as tracking area or routing area, TA/RA. It is to be noted that while specific terminology of specific systems may be applied for describing the present invention, this serves as an example only. Thus, while tracking area denotes one or more cells in a LTE system, (Long Term Evolution), a routing area may denote the same or similar under the UMTS system specification.

FIG. 1 illustrates such a tracking area/routing area TA/RA which contains at least two different radio access technologies RAT. Those are denoted as RAT#1 for the LTE part as well as RAT#2 for a UMTS or WLAN part. For the first radio access technology RAT#1, a network node is represented by an evolved Node_B eNB, while for the UMTS or WLAN part, a network node is represented by Node_B or an access point, for example.

On a higher network layer, the evolved Node_B eNB is under control of a mobility management entity MME, while for the UMTS part, for example, a Node_B is under control and/or coordinated by a radio network controller RNC.

Within the tracking area and/or routing area, more generally, within the coverage area of the eNB and/or the access point AP, at least one terminal UE is assumed to be present. Of course, under normal situations, a plurality of terminals is present but a single one only is shown here to keep explanation simple.

The terminal is for example a user equipment and denoted as UE#1. The dotted representation of UE#1 intends to designate that the UE is able to move within the coverage area. The eNB and the access point AP may be in close proximity to each other. They operate based on different radio access technologies, and within a radio access technology, they may operate on different frequencies. For example, the eNB is illustrated to operate on frequencies f1 and f2, while the access point is illustrated to operate on frequencies f3 and f4. Frequencies are used as an example only. If the systems operate rather on codes instead of frequencies, frequencies can be replaced by codes while no other significant changes will result therefrom for the purpose of the present invention.

In the present context, each frequency is also referred to as layer and in view of the plurality of frequencies operating in the same geographical area, they are also referred to as being overlaid to each other. Within such network arrangement, various services are provided. For example, speech and data transmission are provided as services. Likewise, also multimedia applications/services are provided. As a particular specific service, reference is made herein to the multimedia broadcast multicast service MBMS. It is assumed that this service operates on frequency f1 and thus on layer 1 (or in cell 1) only. Terminals such as the one represented by UE#1 are generally handheld devices or mobile devices that can access services via one or more access technologies. They may be exemplified by smart phones, laptop computers or the like. With particular reference to the LTE network as a mere example only, like in other mobile communication networks under development or preexisting, it is always intended to specify mechanisms which enable a network to provide continuity of services. This also applies to the current and the subsequent release of the LTE network.

In particular, with the emerging multimedia services, continuity for LTE MBMS services is also one concern. Currently, multicast broadcast multimedia services are discussed to be implemented as a so called MBMS single frequency network (MBSFN). This implies that MBMS service as an example of the specific service is delivered using the LTE infrastructure and provides services such as mobile TV using a plurality of time synchronized eNB's operating on a same resource block. This means, that the receiving user equipment is enabled to combine transmissions originating at different eNB's. Stated in other words, the same content is sent from different eNB's in wireless manner to the UE.

Thus, as illustrated in FIG. 1, for the purpose of the present invention, MBSFN is provided in an illustrated deployment scenario involving one or more frequencies. As shown, MBMS service is provided in a specific, single frequency (f1) only. With regard to the user equipments, this MBMS service frequency can differ from a frequency on which a user equipment normally camps while being in an idle state.

User equipments UE are normally in one of three possible states, detached, active, or idle. Detached means a state during which the mobile station or user equipment is powered off, active is the state after registration and having a connection with the network, while idle is a power saving state where a user equipment is not in communication, i.e. it neither transmits nor receives packets to/from the network.

In such idle state, the location of the user equipment is only known at the mobility management entity MME with the precision of a tracking area spanning over one or multiple cells. In such idle state, when new traffic arrives for the user equipment, the user equipment is paged via all available radio access technologies and dependent on the response received, communication is resumed or started in the radio access technology and/or layer (on the frequency) in which the response was received. Thus, while a user equipment is in idle mode, it may be camping in a radio access technology and/or on a frequency that differs from the technology/frequency on which the MBMS service is available.

Therefore, this invention as described herein below will define methods to provide, if desired, an MBMS service or services (or any other specific service that might differ from the MBMS service, that is also provided on a specific frequency only), for terminals being in an idle mode in terms of radio resource control RRC. In terms of sufficient radio resource usage, like in all wireless networks, measures have to be taken in order to efficiently use such resources. In case that multiple frequencies are overlaid in the same area, the MBMS service being broadcasted is likely to be configured to pertain to a certain cell layer or frequency only.

This is illustrated in FIG. 1. In order to control user equipments in idle mode, to camp on a certain layer of frequency and/or radio access network technology, the network such as the mobility management entity MME and/or evolved Node_B eNB can include the priority for each frequency layer and radio access technology. Such information is part of the system information and/or system information block SIB. The user equipment follows those indications and states in the highest priority layer, and for cell reselection, the user equipment takes into account such indicated priority as given in the system information blocks SIB.

Thus, an eNB comprises a transmitter module, which is configured to transmit a priority indication of an assigned priority for plural communication layers within a coverage area of the eNB. In connection with the present invention, the eNB is configured also to indicate a service indication assigned to at least of said communication layers on which layer a terminal may access a specific service such as the MBMS service. I.e., the eNB may indicate on which layer the specific service such as MBMS is available. (Insofar, in the context of the present description, this aspect should not be understood as relating to cross carrier indication.)

FIG. 1 represents this as the table in the upper right hand designating network assigned priorities for specific radio access technologies and the frequency used therein. In addition, the table includes the so called MBMS flag as the service indication. Thus, as shown in this network assigned table, it consists of the columns MBMS flag, priority, RAT, frequency and indicates for each radio access technology and frequency used therein the network assigned priority and in addition whether a certain frequency within a certain radio access technology provides for a specific service such as the MBMS. In the illustrated table, the MBMS flag indicates that the MBMS service is provided (YES) on RAT1 at frequency #1 with the currently assigned priority P2 for this layer.

Although in this exemplarily illustrated example, highest priorities are assigned lowest (smallest) numbers, assignment of numbers to priorities may be different. For example, also a priority assignment as adopted in 3GPP can be used. I.e. when assigning 8 priority levels from 0 to 7, level 0 designates lowest priority, while level 7 designates utmost (highest) priority.

The user equipment UE receives such broadcasted information and normally follows the indications given therein. Namely, the user equipment preferably stays in the highest priority layer. If, however, all user equipments would stay in the highest priority layer, load balancing may be become difficult. Also, as shown in the table, the MBMS layer is not necessarily the highest priority.

Under one aspect of the present invention, the user equipment therefore comprises the receiver module which is configured to receive a priority indication of assigned priority for plural communication layers available within a coverage area of a network node and configured to receive a service indication assigned to at least one of said communication layers on which layer a terminal may access a specific service, as laid down for example in the table described above. Furthermore, the user equipment comprises a processor module which is configured to manipulate the received priority indication of assigned priority for the communication layers. This manipulation is shown in the lower table of FIG. 1 (labeled UE manipulated).

The columns and entries are basically the same; however, the priorities in the first two lines were exchanged, i.e. manipulated. In such state, under the assumption that the user equipment camps on the highest priority layer, this highest priority layer is then the layer in which MBMS is provisioned. Hence, an idle mode UE may be enabled to access the MBMS as an example of a specific service when assigned the highest priority. Thus, in case plural user equipments are present, those who are not interested in perceiving the MBMS service follow the network assigned rules for camping in idle mode in one of the layers, while those interested in the MBMS service manipulate such table and follow their own individually manipulated priority table in such scenario.

Thus, load balancing can to a certain extent already be achieved by allowing only those user equipments to manipulate the priority of the layers in which they camp that are interested in the specific service such as the MBMS service. According to at least further aspects, the present invention provides for a standardized user equipment behavior which prevents a loss of control by the network while preserving the user equipment capability to receive a specific service such as the MBMS by introduction of at least one permission parameter in addition.

This will be set out in greater detail with reference to FIGS. 2 and 3 described herein below.

Figure 2:
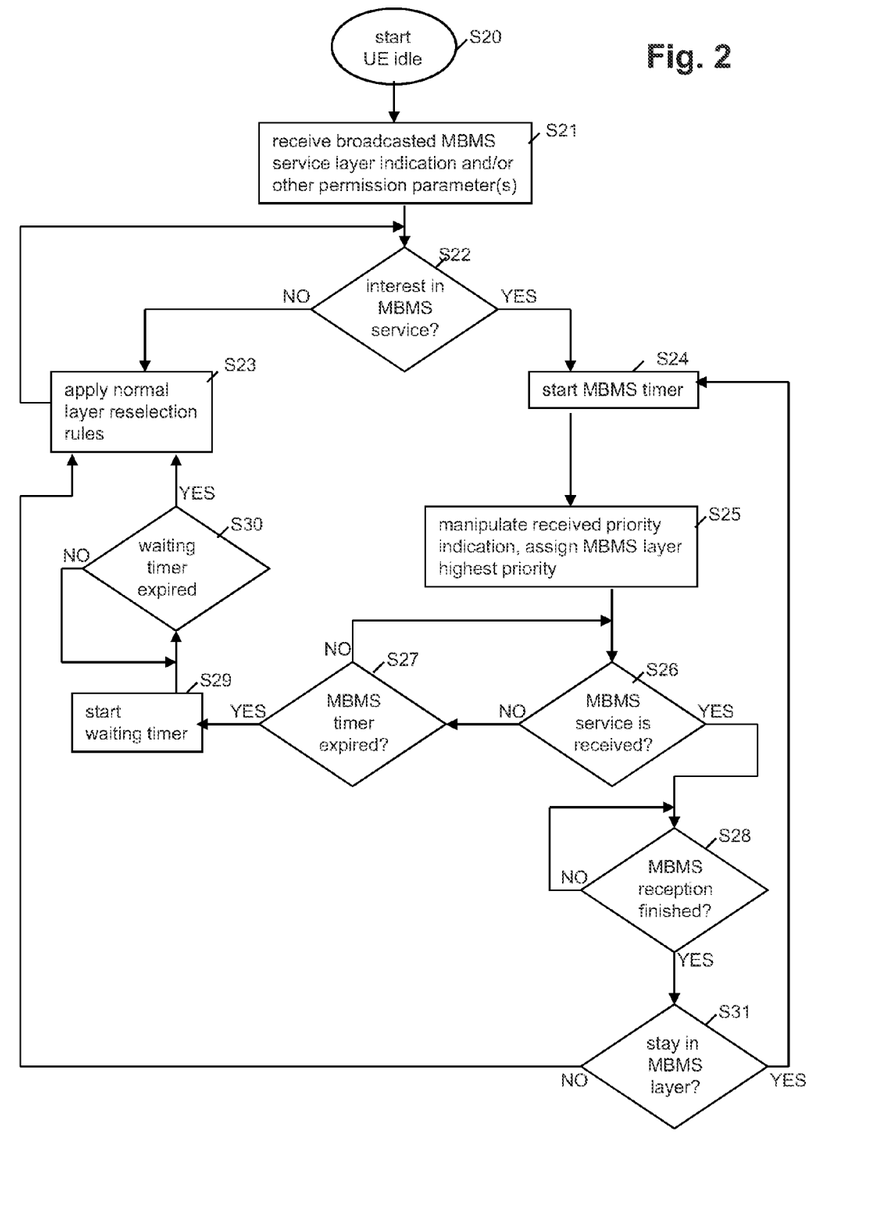
FIG. 2 is a flowchart illustrating method steps performed at a terminal device UE.

FIG. 2 illustrates method steps performed at a user equipment. FIG. 2 illustrates the process carried out at a user equipment in idle state. The process starts in step S20. In a subsequent step S21, the user equipment receives the broadcasted MBMS service layer indication and/or other permission parameters. The service layer indication for example comprises the information as broadcasted in the table "network assigned" shown in relation to FIG. 1.

In the following step S22, the user equipment determines whether it is interested in MBMS service reception or not. If not, the normal layer reselection rules are applied in step S23, and the flow loops back to step S22 to determine (subsequently) whether die MBMS service interest is then given at the idle user equipment. (In at least a modification (not shown), looping back can occur from S23 to S21 and then to S22.)

If YES in S22, the flow proceeds to step S24. In step S24, a MBMS timer is started. The MBMS timer, similar to a waiting timer to be described later on, is one of at least one permission parameter. Namely, the MBMS timer as a first timing parameter controls the processor module of the user equipment in terms of permitting the terminal to initiate action in regard to accessing the specific service. Namely, in at least one exemplary embodiment, if the MBMS service interest is given and the MBMS timer is started, the user equipment manipulates the received priority indication (table "network assigned") in that it assigns the MBMS layer the highest priority (table "UE manipulated"). Whereas, in at least another exemplary embodiment, if the MBMS service interest is given, and the user equipment manipulated the received priority indication (table "network assigned") in that it assigns the MBMS layer the highest priority (table "UE manipulated"), while the MBMS timer is not expired, the UE can actually participate in MBMS service reception, whereas after expiry of the MBMS timer, the UE is forced to follow normal layer reselection rules.

This is a first action enabling the user equipment to access the specific service (while still being in idle state) in step S25. Thereafter, it is checked in step S26, whether the MBMS service is actually received. If it is received (YES), the flow advances to step S28 where it is checked whether the MBMS reception is already finished or not. If not, the process loops back to step S28 until the MBMS reception is finished. If it is finished, in a subsequent step S31, it is decided whether the user equipment wishes to stay in the MBMS layer (i.e. in the manipulated layer). Note that while the MBMS service is being received (S26, S28), the user equipment is in active mode and is RRC connected, and once finished, the user equipment returns to idle mode (transition between steps S28 and S31). If it is decided to stay in the MBMS layer in step S31, the flow returns to step S24 where the MBMS timer is restarted. If it is not desired to stay in the MBMS layer in step S31, the flow advances back to step S23 and normal layer reselection rules are applied, and subsequently to S22, where it is checked whether (new) interest in MBMS service is given subsequently. (As mentioned above, in at least a modification (not shown), looping back can occur from S23 to S21 and then to S22.)

On the other hand, while the MBMS timer was started and no MBMS service is received (NO in step S26), the flow advances to step S27 where it is checked whether the MBMS timer expired already. If the timer did not expire, the flow returns to step S26 to check for reception of an MBMS service. Thus, if no MBMS service is received up to the expiry of the timer, then, YES in step S27, the flow proceeds to step S29. In step S29, a waiting timer is started as a second permission parameter. The MBMS timer may have a different or identical time value compared to the waiting timer.

Thereafter, it is checked in step S30 whether the waiting timer expired. If not, the flow returns to step S30 and the next check is conducted. Once the waiting timer expired (YES in step S30), the flow returns to step S23 and normal layer reselection rules are applied, and subsequently (in a modification via step S21) to S22, where it is checked whether (new) interest in MBMS service is given subsequently.

Thus, the MBMS timer as a first timing parameter of at least one permission parameter allows the network to get back control over the user equipments, so that the user equipments do not switch in an uncontrolled manner to the preferred highest priority layer on the which the MBMS service might exclusively be offered. They are thus allowed to camp on the MBMS layer only for as long as the MBMS timer does not expire while they are not actually receiving an MBMS service.

Moreover, by virtue of the (optional) waiting timer as a second timing parameter of the at least one permission parameter, it is assured that the user equipment does not too frequently (or more or less permanently) switch to the MBMS layer. Namely, if after switching to the MBMS layer in step S25, no MBMS service is received during the time defined by the MBMS timer, the waiting timer will keep such a user equipment waiting before it may indicate a new interest in the MBMS service. This gives the network even more control over the user equipment and the layer/frequency in which UE's are camping.

Also, in a modification, the waiting timer can also be applied in the branch from step S23 back to S22. In such modification, the UE then already follows the normal layer reselection rules while being prevented from manipulating layer priorities until the waiting timer expires.

Of course, the sequence of at least steps S24 and S25 may be exchanged in another exemplary embodiment. Thus, once the user equipment is interested in the MBMS service, it may manipulate already the MBMS layer priority and thereafter start the MBMS timer.

Also, in still a further modification (not shown), the waiting timer can also be applied in the branch labeled "NO" after step S31, and/or in the branch from step S23 back to S22.

In the foregoing exemplary embodiment, the timer also runs during the situation when the UE is actually receiving an MBMS service, and is not checked in terms of its expiry. Though, in the situation in which no MBMS service is received, the MBMS timer fulfils its purpose to restrict UEs "hanging around" on carriers prioritized because of MBMS and thus potentially overloading such carriers/layers although they do not actually receive an MBMS service in such scenario.

Figure 3:
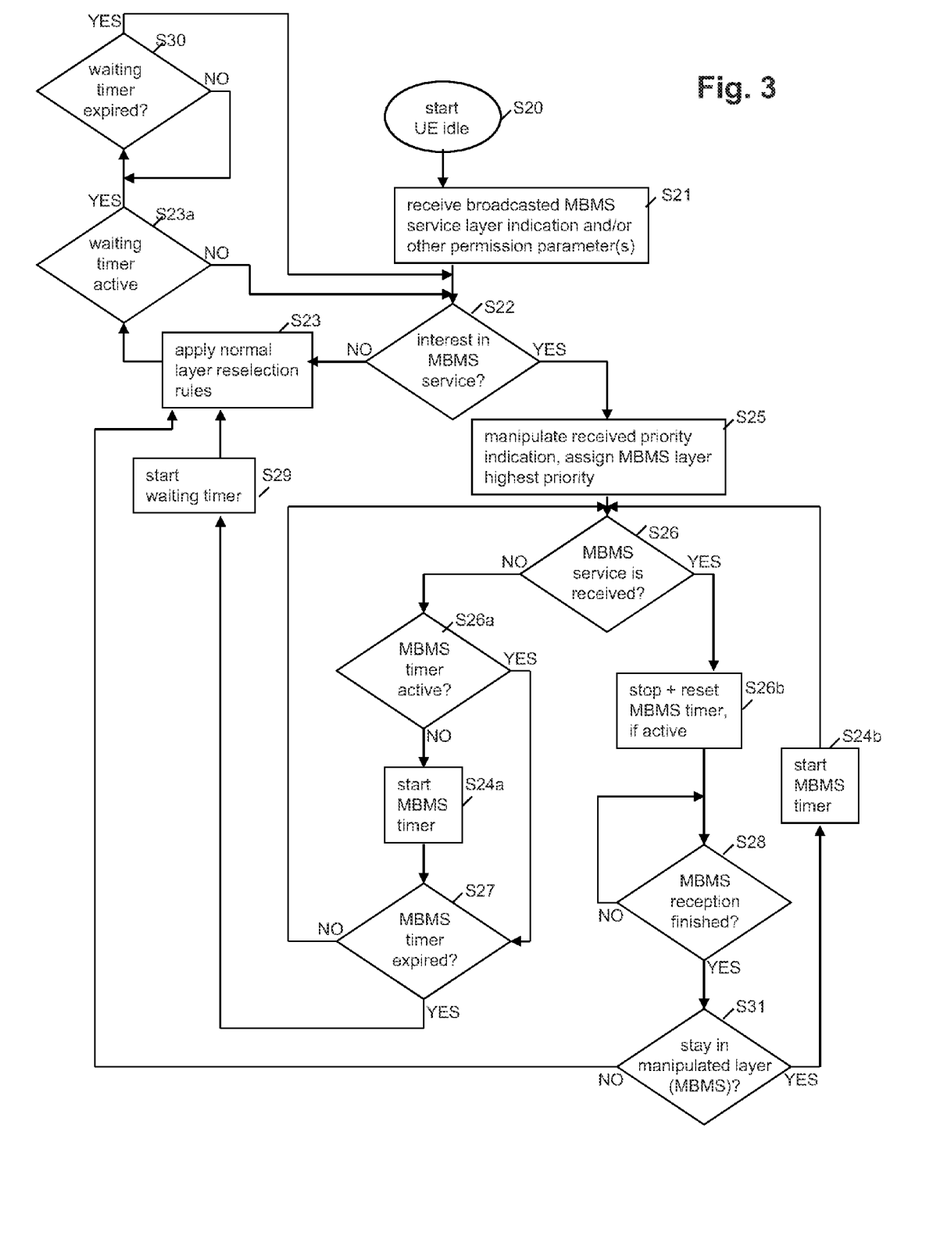
FIG. 3 is a flowchart illustrating method steps according to a modification as performed at a terminal device UE.

In a modification shown in FIG. 3, the MBMS timer is started when both of the following become in effect (e.g. one turns TRUE while the other already was TRUE): 1) The UE camps on a frequency/layer other than that otherwise dictated by the regular reselection priorities (i.e. on a layer manipulated in terms of assigned priority); and 2) the UE is not (or not anymore) receiving an MBMS service on that carrier.

When running or active, the MBMS timer is stopped and reset when either one of the above stops being true.

In detail, also FIG. 3 illustrates method steps performed at a user equipment in idle state. Steps also occurring in relation to FIG. 2 are assigned the same reference numerals. Those steps also perform the same functions as described in relation to FIG. 2. Therefore, a repeated description thereof is omitted here. Rather, the sequence of steps is at least partly modified. The identical steps are steps S20, S21, S22, S23, S25, S26, S28, S31, S27, S29, S30, and S31.

The sequence is thus as follows and as illustrated in FIG. 3. The process starts in S20, proceeds to S21, and to S22. If NO in S22, the flow advances to S23. If YES in S22, the flow advances to S25, and from there to S26.

If NO in S26, it is checked in a step S26a whether a MBMS timer is active. If not active (NO in S26a), the flow proceeds to step S24a and the MBMS timer is started. Then the flow proceeds to S27. Likewise, if in step S26a it is found that the MBMS timer is active, the flow advances to S27. Activity of the MBMS timer can be determined e.g. based on a MBMS timer flag set upon activation of the timer, or by other measures.

In S27, if the MBMS timer did not expire (NO in S27), the flow returns to S26. If expired, the flow advances to S29 and a waiting timer is started. From S29, the flow advances to S23.

If YES in S26, the flow advances to S26b. In step S26b, if the MBMS timer is found to be active, the MBMS timer is stopped and reset, and thereafter, the flow advances to S28.

If in S26b the MBMS timer is found to be not active, nothing happens and the flow advances to S28. After checking for a finished MBMS reception in S28 is completed (YES in S28), the flow advances to S31. In case of NO in S31, the flow advances to S23. In case of YES in S31, the flow loops back, via a step S24b in which the MBMS timer is started, to step S26.

While normal layer reselection rules are being applied in S23, after and/or during this it is checked in a step S23a whether the waiting timer is active or not. Such determination can be made similar to the determination of activity of the MBMS timer. If NO in S23a, the flow proceeds (back) to S22. If YES in S23a, the flow proceeds to step S30. This step is repeated until waiting timer expiry (NO in S30). If expired, i.e. YES in S30, the flow proceeds to S22.

It is thus understood, that still further modifications could be made without changing the inventive concept of the present invention.

The present invention proposes, under a terminal aspect, a device, comprising a receiver module, configured to receive a priority indication of assigned priority for plural communication layers available within a coverage area of a network node, and configured to receive a service indication assigned to at least one of said communication layers on which layer a terminal may access a specific service, and a processor module, configured to manipulate the received priority indication of assigned priority for the communication layers, said processor module is controlled in terms of manipulating the received priority indication for initiating action in regard to accessing the specific service based on at least one permission parameter, wherein said at least one permission parameter comprises a first timing parameter controlling the processor module in terms of permitting the terminal to initiate action in regard to accessing the specific service. Correspondingly, under a network node aspect, the present invention addresses a device, comprising a transmitter module configured to transmit a priority indication of assigned priority for plural communication layers available within a coverage area of the device, and configured to indicate a service indication assigned to at least one of said communication layers on which layer a terminal may access a specific service, said transmitter module is further configured to transmit at least one permission parameter controlling a receiving terminal in terms of initiating action in regard to accessing the specific service, wherein said at least one permission parameter comprises a first timing parameter controlling the receiving terminal in terms of permitting the terminal to initiate action in regard to accessing the specific service. For both aspects, corresponding methods are also proposed.

The invention claimed is:

1. A radio network node, comprising:
  a transmitter module and a processor module which together are
    configured to transmit a priority indication of assigned priority for plural radio frequencies available within a coverage area of the radio network node, and
    configured to indicate a Multimedia Broadcast-Multimedia Multicast Service (MBMS) service indication assigned to at least one of said radio frequencies that identifies said at least one radio frequency as a MBMS radio frequency,
    said transmitter module is further configured to transmit at least one permission parameter controlling a receiving terminal in terms of initiating action in regard to accessing a specific MBMS,
  wherein:
    said at least one permission parameter comprises a first timing parameter for setting at the receiving terminal a time limit for manipulating the priority indication in order to permit the receiving terminal to initiate action in regard to accessing the specific MBMS;
    the at least one permission parameter is transmitted to the receiving terminal in dedicated or broadcast signaling; and
    the time limit allows the receiving terminal to manipulate the priority indication of the at least one MBMS radio frequency, relative to the priority indications for other of the radio frequencies, only while the time limit is not expired.

2. The radio network node according to claim 1, wherein at least said service indication is broadcasted to all terminals within the coverage area of the radio network node.

3. The radio network node according to claim 1, wherein said at least one permission parameter is
  broadcasted via a shared channel and valid for all receiving terminals or
  transmitted via a dedicated channel and valid for the receiving terminal to which the dedicated channel is associated.

4. The radio network node according to claim 1, wherein said at least one permission parameter comprises
  a second timing parameter controlling the receiving terminal in terms of inhibiting the receiving terminal to initiate action in regard to accessing the specific service.

5. A method for operating a radio network node, comprising:
  transmitting from a radio network node a priority indication of assigned priority for plural radio frequencies available within a coverage area of the radio network node,
  indicating by the radio network node a Multimedia Broadcast-Multimedia Multicast Service (MBMS) service indication assigned to at least one of said radio frequencies that identifies said at least one radio frequency as a MBMS radio frequency, and
  transmitting by the radio network node at least one permission parameter controlling the receiving terminal in terms of initiating action in regard to accessing a specific MBMS,
  wherein:
    said at least one permission parameter comprises a first timing parameter for setting at the receiving terminal a time limit for manipulating the priority indication in order to permit the receiving terminal to initiate action in regard to accessing the specific MBMS;
    the at least one permission parameter is transmitted to the receiving terminal in dedicated or broadcast signaling, and
    the time limit allows the receiving terminal to manipulate the priority indication of the at least one MBMS radio frequency, relative to the priority indications for other of the radio frequencies, only while the time limit is not expired.

6. The method according to claim 5, further comprising broadcasting from the radio network node at least said service indication to all terminals within the coverage area of the radio network node.

7. The method according to claim 5, further comprising
  broadcasting said at least one permission parameter from the radio network node via a shared channel and being valid for all receiving terminals or
  transmitting said at least one permission parameter from the radio network node via a dedicated channel and being valid for the receiving terminal to which the dedicated channel is associated.

8. The method according to claim 5, wherein said at least one permission parameter comprises a second timing parameter controlling the receiving terminal in terms of inhibiting the receiving terminal to initiate action in regard to accessing the specific MBMS.

9. A method for operating a user equipment, comprising:
  receiving at the user equipment a priority indication of assigned priority for plural radio frequencies available within a coverage area of network node, and configured to receive a Multimedia Broadcast-Multimedia Multicast Service (MBMS) service indication assigned to at least one of said radio frequencies that identifies said at least one radio frequency as a MBMS radio frequency,
  manipulating at the user equipment the received priority indication of assigned priority for the radio frequencies, and controlling at the user equipment the manipulating of the received priority indication for initiating action in regard to accessing the specific MBMS, based on at least one permission parameter received at the user equipment via dedicated or broadcast signaling,
wherein:
said at least one permission parameter comprises a first timing parameter for setting at the user equipment a time limit for manipulating the priority indication in order to permit the user equipment to initiate action in regard to accessing the specific MBMS; and
the time limit allows the receiving terminal to manipulate the priority indication of the at least one MBMS radio frequency, relative to the priority indications for other of the radio frequencies, only while the time limit is not expired.

10. The method according to claim 9, further comprising receiving at the user equipment at least said service indication on a broadcast control channel.

11. The method according to claim 9, further comprising receiving at the user equipment said at least one permission parameter on a shared control channel, or on a dedicated channel associated to the user equipment.

12. The method according to claim 9, wherein said at least one permission parameter comprises
a second timing parameter controlling the manipulating in terms of inhibiting the user equipment to initiate action in regard to accessing the specific service.

13. The method according to claim 9, further comprising starting a first timer at the user equipment using the first timing parameter, if the user equipment manipulated the received priority indication and if the user equipment does not yet or not anymore receive the specific MBMS on the radio frequency of which the priority indication was manipulated.

14. The method according to claim 13, wherein the timer is stopped and reset when either of the claim 13 conditions is no longer true.

* * * * *